(12) United States Patent
Nagasaka

(10) Patent No.: US 6,490,239 B1
(45) Date of Patent: Dec. 3, 2002

(54) OPTICAL DISC WITH PIT INTERVAL AND DEPTH FOR MAXIMUM VISUAL EFFECT

(75) Inventor: Kimio Nagasaka, Nirasaki (JP)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 09/692,115

(22) Filed: Oct. 18, 2000

(30) Foreign Application Priority Data

Oct. 20, 1999 (JP) .......................................... 11-298539

(51) Int. Cl.$^7$ ................................................. G11B 7/24
(52) U.S. Cl. ................................... 369/275.4; 369/275.3
(58) Field of Search .......................... 369/275.3, 275.1, 369/275.4, 277, 278, 279, 275.2, 273, 288, 283, 282, 286, 103, 280; 428/64.1, 64.2, 64.4, 40.1, 40.2, 41.3; 156/391

(56) References Cited

U.S. PATENT DOCUMENTS

| | | | | |
|---|---|---|---|---|
| 5,608,718 A | * | 3/1997 | Schiewe ................... | 369/275.4 |
| 5,675,570 A | * | 10/1997 | Ohira et al. ............... | 369/275.1 |
| 5,751,671 A | * | 5/1998 | Koike et al. ................ | 369/14 |
| 5,751,690 A | * | 5/1998 | Ohira et al. ............... | 369/275.3 |
| 5,809,003 A | * | 9/1998 | Taira et al. ............... | 369/275.1 |
| 5,858,498 A | * | 1/1999 | Ohkubo et al. ............ | 428/64.1 |
| 5,982,737 A | * | 11/1999 | Takagishi et al. ......... | 369/275.1 |
| 6,232,036 B1 | * | 5/2001 | Suzuki et al. ................ | 8/64.4 |
| 6,265,043 B1 | * | 7/2001 | Vinyard et al. ............ | 428/40.1 |
| 6,287,660 B1 | * | 9/2001 | Hosaka et al. ............. | 428/64.1 |

FOREIGN PATENT DOCUMENTS

| | | |
|---|---|---|
| JP | 8-167170 | 6/1996 |
| JP | 8-194972 | 7/1996 |
| JP | 8-287525 | 11/1996 |
| JP | 8-287526 | 11/1996 |
| JP | 10-11814 | 1/1998 |

* cited by examiner

Primary Examiner—Ali Neyzari
(74) Attorney, Agent, or Firm—Mark P. Watson

(57) ABSTRACT

An optical disc has the effect of indicating characters and pictures formed thereon by making use of a diffraction phenomenon in areas formed with many pits. The value of the pit interval is selected to provide an improved optical disc capable of clearly indicating the characters and pictures. A relationship between pit interval and the light intensity of a diffracted light is calculated. In accordance with this calculation, the pit interval is set to be within a range from 570 nm to 1000 nm, thereby increasing the light intensity of the diffracted light, thus making it possible to clearly indicate characters and pictures.

2 Claims, 5 Drawing Sheets

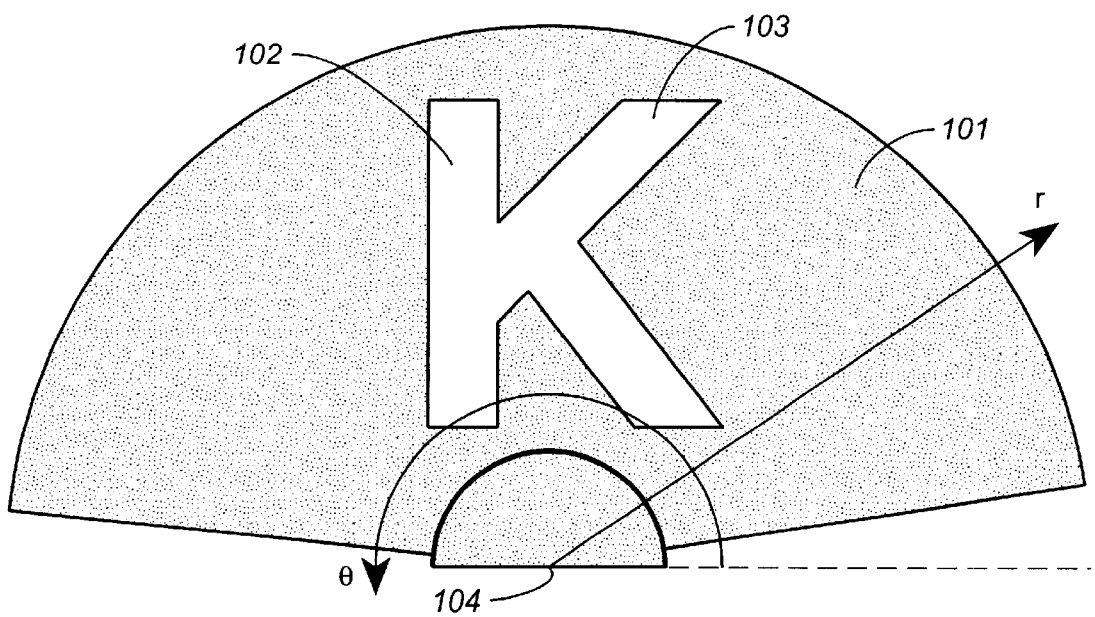
FIG._1

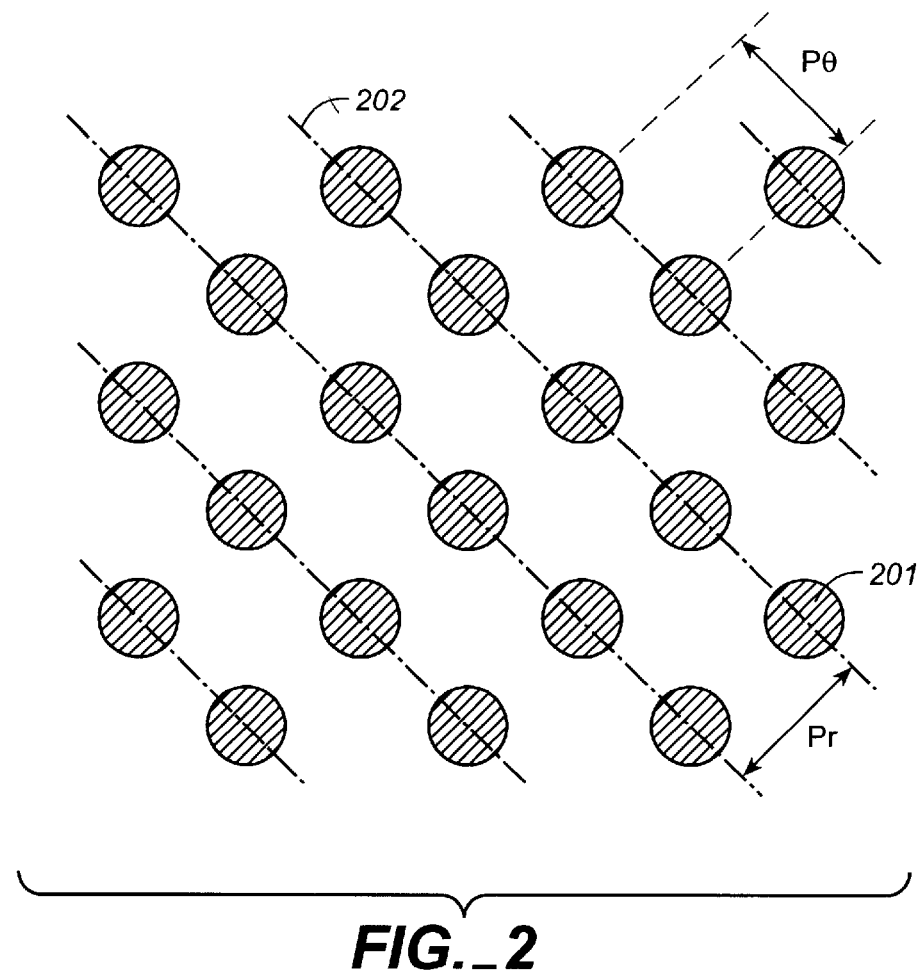
FIG._2
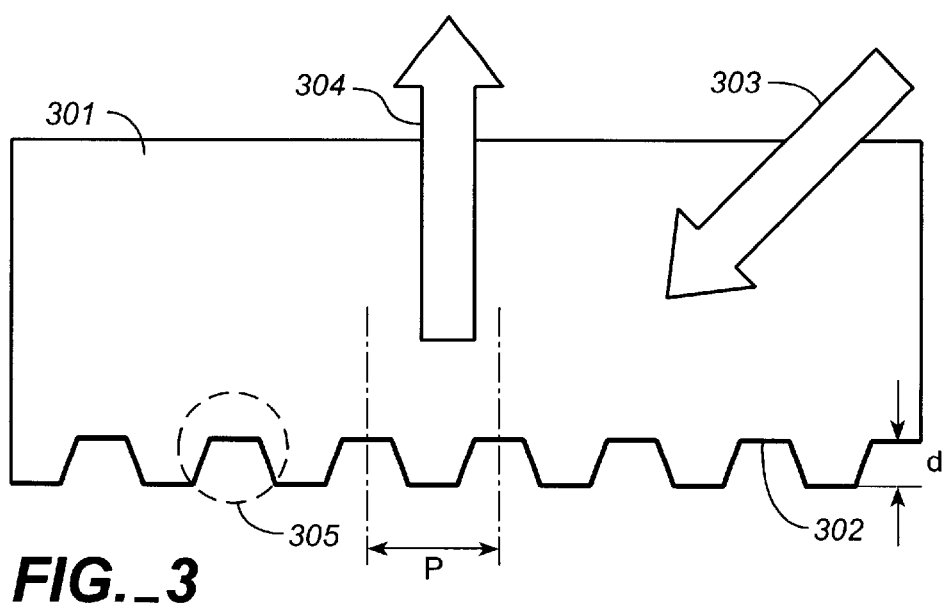
FIG._3

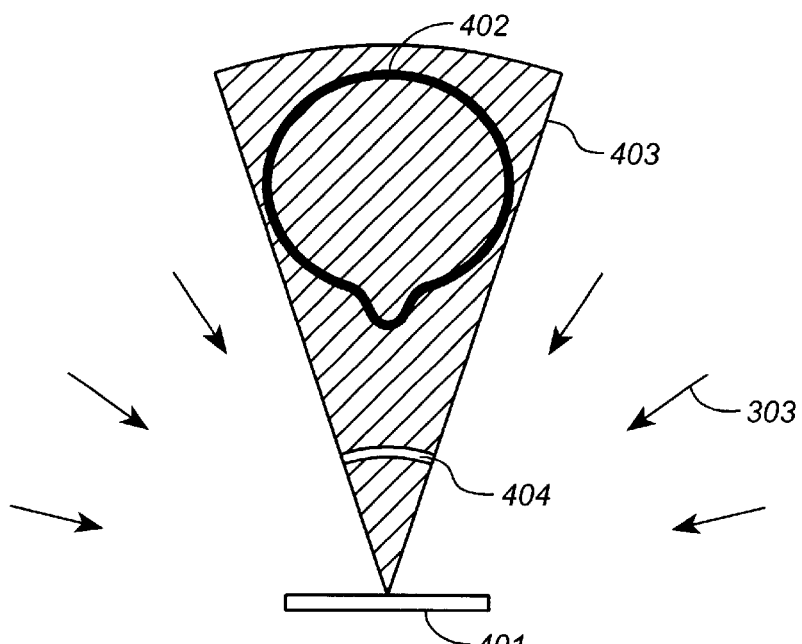
FIG._4
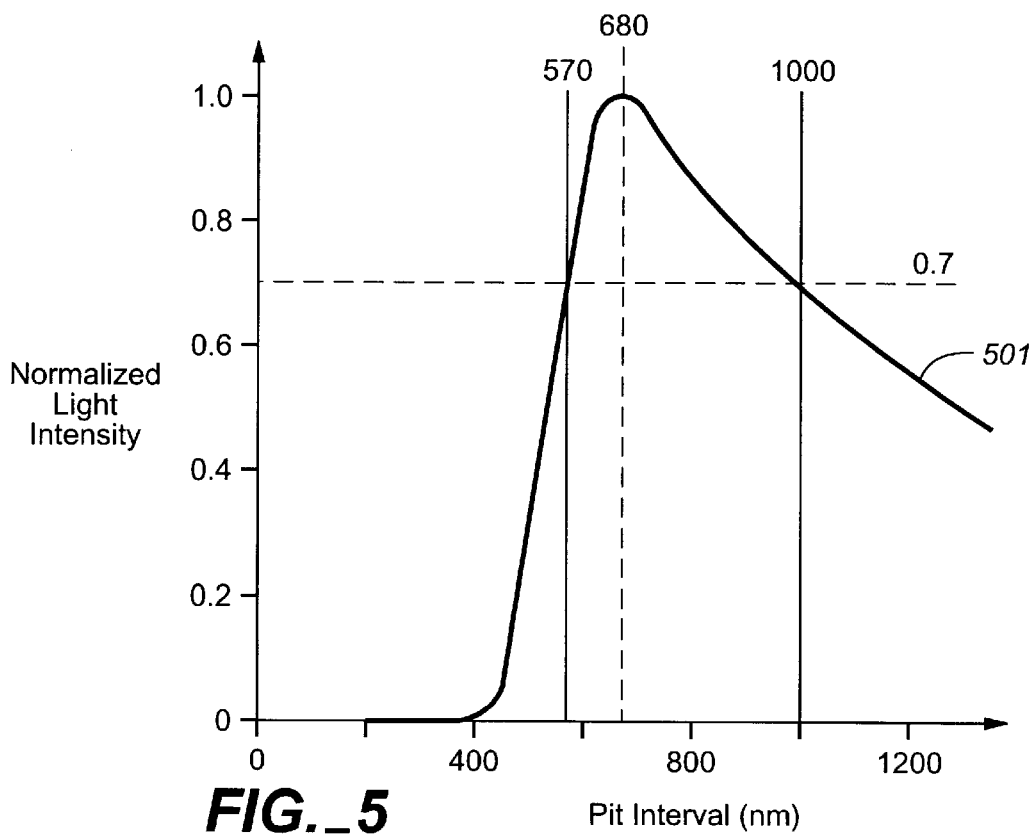
FIG._5

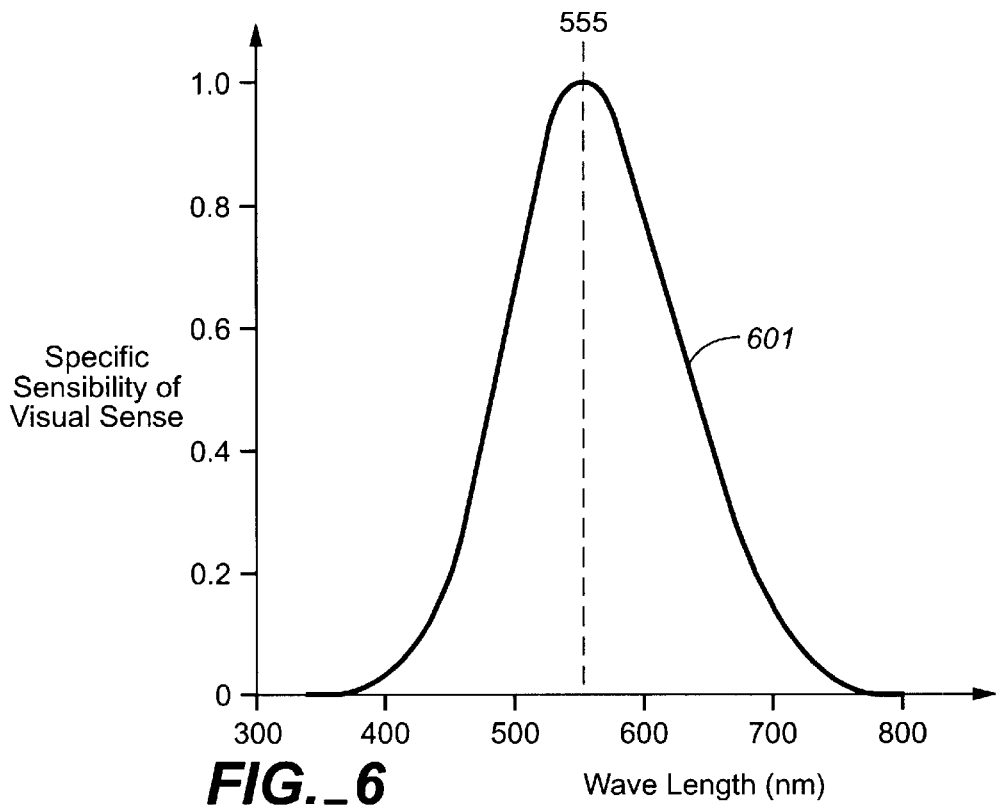
FIG._6
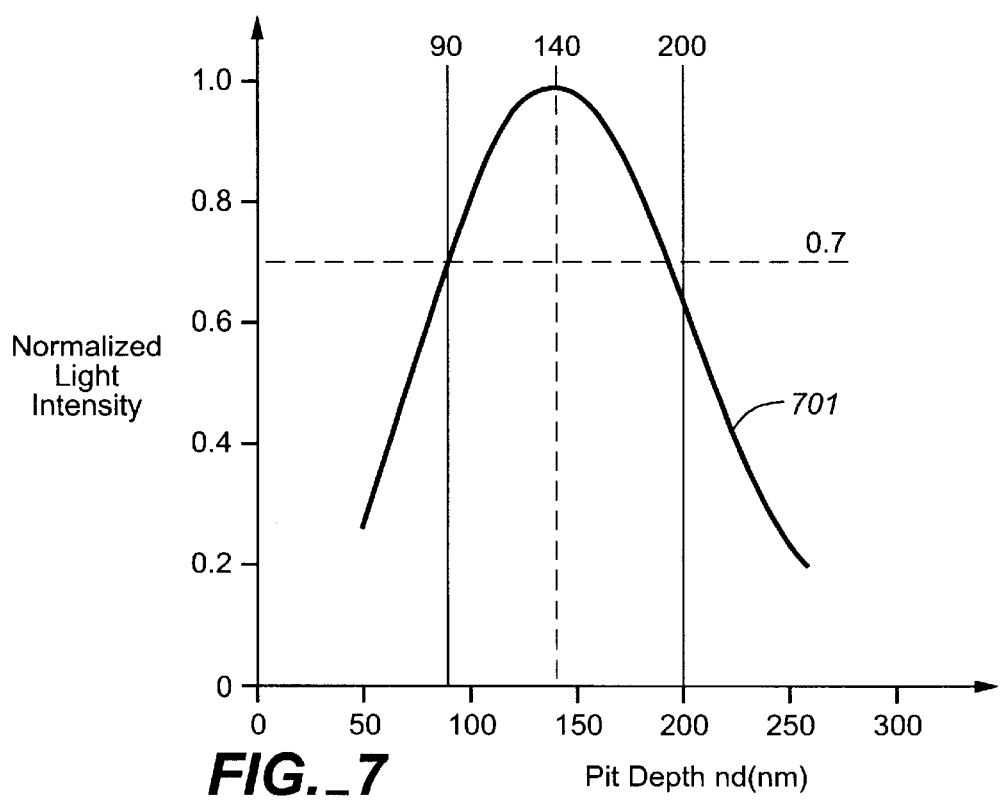
FIG._7

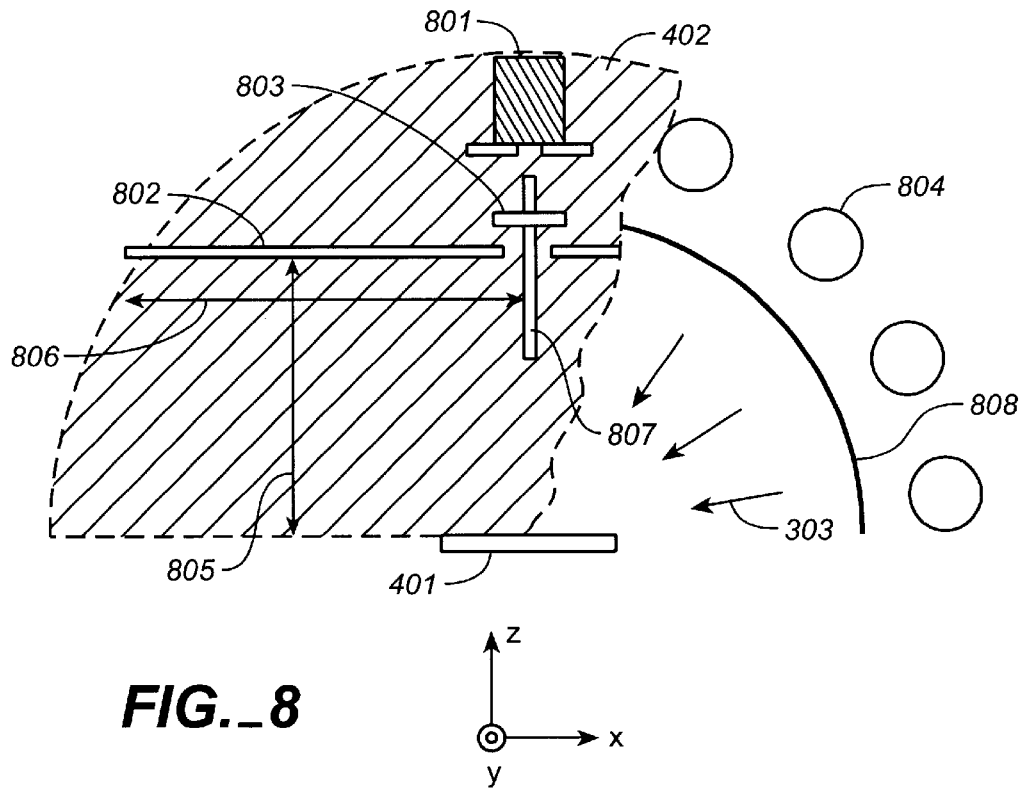
FIG._8
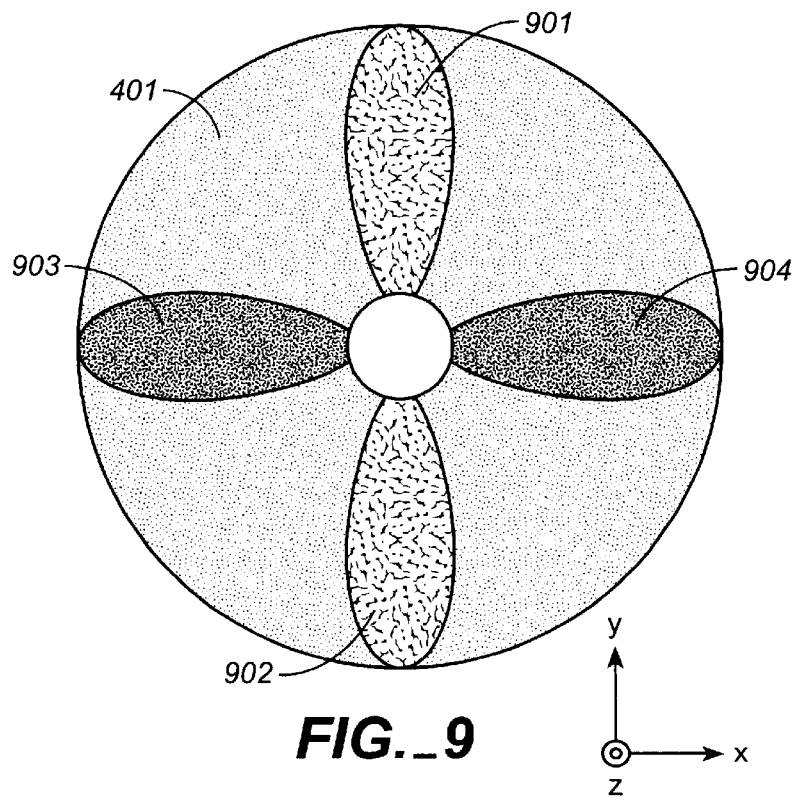
FIG._9

OPTICAL DISC WITH PIT INTERVAL AND DEPTH FOR MAXIMUM VISUAL EFFECT

BACKGROUND OF THE INVENTION

1. Field of the Invention

The present invention relates to an optical disc having an effect of indicating characters and pictures by making use of light diffraction.

2. Description of the Related Art

There has been known a technique in which diffracted light, caused by pits formed on one surface of an optical disc, can be used to indicate characters and pictures on the surface of the disc. In industry, such a technique is usually referred to as a mastering art or a pit art. In practice, when a mastering art disc is formed by bonding together two single-plate discs, such as in a process in which a DVD is manufactured, the outer surface of one of the two single-plate discs is used as a label-indication surface to indicate characters and pictures, so that the title of the DVD may be expressed thereon.

Further, there have been suggested various methods for manufacturing an optical disc using mastering art. However, in practice, a stamper for forming such an optical disc may be manufactured with the use of a conventional mastering process that includes the following steps and will be described as below. (1) A photoresist is applied on to the surface of a master disc made of a glass so as to form a resist layer thereon. (2) A laser cutting machine is used to produce a laser pulse so as to intermittently irradiate the glass-made master disc to form latent pit images on the resist layer. (3) A developing treatment is carried out and some exposed portions of the resist layer are removed. (4) A conductorizing treatment is carried out to form a conductive film on the surface of the resist layer and on some portions of the master disc from which the resist substance has been removed. In detail, the conductive film may be formed by a metal such as Ni, with the use of a film formation process such as electroless plating, sputtering or vapor deposition. (5) An electrocasting treatment is carried out to form a metal layer such as an Ni layer over the conductive film, the electrocasting treatment being continued until a metal layer having a predetermined thickness is formed. (6) The metal layer is removed from the glass-made master disc. (7) The back surface of the metal layer is polished and is then subjected to a pressing treatment so as to form a predetermined outer diameter and a predetermined inner diameter.

Here, the above step (2) will be described in more detail with reference to FIGS. 1 and 2. For example, as shown in FIG. 1, when a character "K" represented by a pattern 103 is indicated in the recording area of an optical disc stamper, pits are not formed in an area 102 of the pattern 103, but are formed in an area 101 excluding the area 102. FIG. 2 is an enlarged view schematically indicating the area 101. In the step (2), the glass-made master disc is rotated, and the laser beam is linearly moved in the radial direction of the disc in a manner such that the area 102 is not exposed while the area 101 is exposed by an intermittently produced pulse. In this way, a stamper made in this step is formed with a spiral track 202 with the rotation center 104 serving as its spiral center, thereby forming many pits 201 at a predetermined interval along the track 202.

Further, when an optical disc is manufactured based on the stamper, it can use the same method as used for manufacturing a common optical disc. Namely, after a resin such as polycarbonate is injection molded, a sputterring apparatus is used to form a reflecting film such as an AlTi film on one surface of the disc having a plurality of pits formed thereon.

FIG. 3 is a view schematically indicating a cross section of an optical disc in its circumferential direction (direction θ in FIG. 1). As shown in FIG. 3, a plurality of pits 305 formed on a stamper at a predetermined interval have been transferred on to one surface of a polycarbonate substrate plate 301. A reflecting film 302 is formed on that same surface of the substrate plate. Here, a center-to-center interval between every two pits is set to be P. Light rays 303 incident on the substrate plate 301 have various spectral characteristics due to different environments. However, the light ray used here is set to be a white light containing equivalently all the light components having various different wavelengths in the range of the visible light. Here, if P is set to be about 1 μm, the light ray 303 passing through the substrate plate 301 will be reflected by the reflecting film 302, thereby obtaining a reflected light. At this time, only some light rays of the reflected light having a specific wavelength in a specific direction will be strengthened by each other, so that these light rays become diffracted light 304 and are allowed to emit outwardly through the substrate plate 301.

FIG. 4 is an explanatory view schematically showing a positional relationship between the diffracted light (represented by reference numeral 304 shown in FIG. 3) from the optical disc 401 on one hand and the position of a viewer on the other. As shown in the figure, the head of an observer 402 is located in the normal line direction of an optical disc 401, so that the observer can observe the optical disc 401 from an upper position above the disc. Here, the observer 402 is assumed to be in a typical living environment, and the light ray 303 is assumed to be a white light ray. Further, the diffracting angles of the diffracted light rays 304 to be observed will be different from one another depending upon their different positions on the optical disc. Further, since the light rays 303 may also be considered to have various different incident angles, various diffracted light rays 304 having different wavelengths can be observed as if a rainbow-like image is formed on the surface of the optical disc.

In this way, by virtue of the above-described diffraction, within the surface of the optical disc 401, the area 101 having pits formed thereon can be observed to have bright rainbow colors. On the other hand, the area 102 having no pits formed thereon will be observed to have a dark color since there is no diffraction occurring thereon. By virtue of such a contrast, a character like "K" shown in FIG. 1 will become clearly visible.

OBJECTS OF THE INVENTION

In order to clearly indicate pictures or characters formed on an optical disc, it is desirable that the diffracted light rays in the area where the pits are formed be bright enough to be clearly observed. In the above example, the wavelength of each diffracted light 304 and the light amount thereof will depend upon the interval between every two pits and pit shape. Further, since people will have different perceptions of different wavelengths of visible lights rays, and since it is desired to clearly observe the diffracted light rays, a suitable pit interval and pit shape is required.

An object of the present invention is to solve the above described problems and a specific object is to calculate the best pit interval and best pit shape that are effective for obtaining a maximum light amount of diffracted light rays, thereby making it possible to clearly indicate any pictures or characters formed on a mastering art disc.

SUMMARY OF THE INVENTION

According to the present invention, it is possible to provide the following first to third types of optical discs.

A first type optical disc according to the present invention has a circular disclike substrate including areas on which a plurality of pits or grooves have been formed, such disc having an effect of indicating characters and pictures by making use of a property in which incident light irradiating the pits or grooves will be diffracted, characterized in that: an interval Pr (nm) between every two pits or every two grooves in the radial direction of the optical disc is $570 \leq Pr \leq 1000$.

A second type optical disc according to the present invention has a circular disc-like substrate including areas on which a plurality of pits or grooves have been formed, such disc having an effect of indicating characters and pictures by making use of a property in which incident light irradiating the pits or grooves will be diffracted, characterized in that: an interval P$\theta$ between every two pits or every two grooves in the circumferential direction of the optical disc is 570 nm $\leq P\theta \leq$ 1000 nm.

A third type optical disc according to the present invention has a circular disc-like substrate including areas on which a plurality of pits or grooves have been formed, such disc having an effect of indicating characters and pictures by making use of a property in which incident light irradiating the pits or grooves will be diffracted, characterized in that: when the depth of each pit or each groove is d and the refraction index of the substrate is n, nd satisfies 90 nm $\leq$ nd $\leq$ 200 nm.

However, each of the optical discs made according to the present invention is formed by bonding together two single-plate discs. Preferably, specifically designed concave/convex structure (depending upon an interval between every two pits or every two grooves, as well as the depth of each pit or each groove) is formed on the surface of the substrate of one single-plate disc having only one surface as its recording surface, thereby obtaining a desired mastering art effect by virtue of the areas having the concave and convex structure.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

FIG. 1 shows the outer appearance of an optical disc in which a character K is indicated by applying the mastering art on the optical disc;

FIG. 2 is a view showing an example in which pits are arranged on an optical disc;

FIG. 3 is a sectional view showing an example of the structure of an optical disc;

FIG. 4 is a view showing a relationship between a person observing an optical disc and light rays irradiating the optical disc;

FIG. 5 is a graph indicating a relationship between the pit interval and the light intensity of a diffracted light from an optical disc;

FIG. 6 is a graph indicating a specific visual sense sensitivity;

FIG. 7 is a graph indicating a relationship between the pit depth and the light intensity of diffracted light from an optical disc;

FIG. 8 shows a measuring model for measuring the light intensity of diffracted light; and FIG. 9 is a view showing light diffracting areas of an optical disc.

DESCRIPTION OF THE PREFERRED EMBODIMENTS

In the following, several embodiments of the present invention will be described with reference to the accompanying drawings.

First Embodiment

An embodiment of a first type optical disc according to the present invention will be described with reference to FIG. 4, FIG. 5, FIG. 6, FIG. 8, and FIG. 9. Such description will explain, in accordance with the present invention, a method for calculating an optimum value of pit interval or groove interval in the radial direction of an optical disc.

When a mastering art optical disc is held in the hand of a person and its picture or character is being observed, the disc is usually held at a distance of 25 cm from the person's eyes for the typical observer with ordinary eyesight. Such a distance is usually referred to as "least distance of distinct vision". As shown in FIG. 4, the light rays 303 entering the optical disc 401 are light rays emitted from several light sources surrounding the optical disc 401. If the surrounding environment is a usual day-time environment, the light sources might be fluorescent lamps and the sun light coming through glass windows, producing direct light rays or indirect light rays. Here, the fluorescent lamps and the sunlight may be white lights having almost no bias in their spectral emitting amounts. Further, even if the lights are indirect lights, their spectral characteristics will still depend upon the reflection spectrums of surrounding objects. For this reason, since it is impossible to specify a particular light, it is considered that the lights in all kinds of environments are white lights. In this way, the light rays 303 irradiating the optical disc 401 may be supposed to be white light rays. Moreover, since the light rays 303 are incident on the disc in all directions except those occupied by the observer 402, the observer 402 will produce a shadow space 403. Therefore, the light rays 303 will be incident on the optical disc 401 through a space in front of the disc along almost all directions except a solid angle 404.

Here, under a condition illustrated in FIG. 4, a measuring model shown in FIG. 8 was prepared, and an experiment was conducted to calculate an incident condition in which the diffracted lights from the optical disc 401 enter the pupils of the observer 402 with the highest light intensity.

Then, a mask 802 is placed in a direction along the normal line of the optical disc 401, and is separated from the disc at a distance 805. Here, the distance 805 is set to be an average distance that a person would hold the disc and observe it. Such distance is set at 250 mm, which is a least distance of distinct vision. The mask 802 is formed with a measuring hole having a diameter of 5 mm, while a distance extending in direction x from the measuring hole to an edge of the mask 802 is set to be a distance 806. The mask 802 presents a pattern simulating a function in which the light rays directed toward the optical disc 401 are partially blocked by the head of an observer. If the face of the observer has a substantially circular shape, and its semi-diameter is approximately 100 mm, the distance 806 is set to be 100 mm. In practice, the light rays can enter the optical disc 401 from both the left and right sides of the observer 402 and from an upper space above the disc. However, in order to calculate a relationship between the pit interval or the groove interval (all in a radial direction) on one hand, and the light intensity of diffracted light 807 on the other, what should be taken into account are only the optical axis of the diffracted light 807 and the light rays 303 contained within a plane perpendicular to the tracks of the optical disc 401. Therefore, white lamps 804 serving as light sources may be placed in this plane. Further, in order for the optical disc 401 to be irradiated uniformly by surrounding lights, a diffusing plate 808 is placed between the white light lamps 804 and the optical disc 401. If the penetrating spectrum of the diffusing plate 808 is uniform within a wavelength range of the visible light and if the incident light rays are white light, the light rays penetrating through the diffusing plate 808 will also become white light.

Moreover, in front of the measuring hole there is provided a photo-detector 801 that is used to measure the light intensity of the diffracted light 807. In order to obtain a coincidence between the spectrum sensitivity of the photo-detector 801 and the visual sense of a person, a color filter 803 is placed between the photo-detector 801 and the mask 802.

In general, the visual sense of a person will vary in its sensitivity due to different wavelengths of surrounding lights. Such a property may be understood by referring to a curve shown in FIG. 6 that provides a standard curve indicating that the visual sense sensitivity of a person will be at its largest value when a light has a wavelength of 555 nm. The curve indicates that the sensitivity of the visual sense of a person becomes highest when the wavelength of a light is at 555 nm. Such a curve (601) is referred to as a specific visual sense sensitivity curve.

Here, the spectrum sensitivity of the photo-detector 801 must be measured in advance, and the color filter 803 must also required to be manufactured such that the spectrum sensitivities of various elements including the color filter 803 will be coincident with the curve 601 representing a specific visual sense sensitivity.

When the measuring model having the above-described construction is used, and the light rays 303 irradiate the optical disc 401, the outer appearance of optical disc 401 when viewed in a direction of axis z is shown in FIG. 9. At this moment, since the light rays 303 are incident to the optical disc exactly along a direction of axis x, an area 903 and an area 904 can be seen brightly. Then, the optical disc 401 is placed in a manner such that light can pass through the measuring hole formed on the mask 802 and the light rays parallel to the axis z will pass through the area 903, thereby making it possible to measure an output value by virtue of the photo-detector 801. This output value is equivalent to "brightness" which would be perceived by a person in the visual sense.

In a laser cutting process for manufacturing an optical disc stamper, at first, a plurality of optical discs 401 are prepared which have different track pitches and different pit intervals in their radial directions. Then, the above-described measuring model is used to perform a predetermined measurement on these optical discs 401 to calculate a relationship between the pit interval and the light intensity of the diffracted light 807, thereby obtaining a curve 501 shown in FIG. 5. According to the curve 501, it is understood that the light intensity will arrive at its largest value when the pit interval is about 680 nm. Further, in order to clearly identify some dark portions of the optical disc, the light intensity must be equal to or larger than 70% of the largest light intensity. As a result, the pit interval Pr (nm) in the radial direction of an optical disc is set between 570 nm and 1000 nm, according to the present invention.

For the above reason, if the pit area is formed such that the pit interval (i.e. the distance between the centers of two adjacent pits) satisfies the condition that $570 \text{ nm} \leq Pr \leq 1000$ nm, it is possible to clearly indicate pictures or characters on an optical disc.

In this way, an optical disc according to the present embodiment may be manufactured in the following process. Namely, the above-described method is used to manufacture an optical disc stamper having a predetermined pit area in which a predetermined pit interval along the radial direction of the disc has been set. Then, the optical disc stamper is used and a resin such as polycarbonate is injection molded, thereby producing the optical disc of the present embodiment.

Second Embodiment

An embodiment of a second type optical disc according to the present invention will be described with reference to FIG. 2, FIG. 3, and FIG. 9.

Similar to the above first embodiment, when the light rays 303 from the light sources are incident on an optical disc 401 in a direction of the axis x, x-direction light components of the light rays 303 will become bright on an area 903 and an area 904 which are both perpendicular to a circumferential direction along which the tracks are formed on the optical disc 401.

However, when the concave/convex structure formed on the surface of the optical disc 401 is grooves or the pit length in the circumferential direction of an optical disc is not proper, the incident light cannot be seen clearly on areas other than the areas 903 and 904. As a result, a problem will occur in which a desired contrast cannot be obtained and an entire picture formed on the entire surface of the optical disc 401 cannot be seen clearly.

In order to solve the above problem, if, for example, in an area 901 and an area 902, it has been made possible to clearly see the areas involving the concave/convex structure, it will be possible to clearly identify any pictures formed on the entire surface of the optical disc 401. In more detail, if the pit interval Pθ in the circumferential direction of an optical disc is equal to the pit interval Pr in the radial direction of an optical disc in the above embodiment 1, the tracks formed in the areas 901 and 902 will become equivalent to those formed with the interval Pr in a direction of axis y, thereby obtaining diffracted lights similar to those in the areas 903 and 904.

For the above reason, if the pit areas are formed such that the pit interval satisfies the condition $570 \text{ nm} \leq P\theta \leq 1000$ nm, it is possible to clearly indicate any pictures formed on the entire surface of an optical disc.

In this way, an optical disc according to the present embodiment may be manufactured in the following process. Namely, the above-described method is used to manufacture an optical disc stamper having a predetermined pit area in which a predetermined pit interval along the circumferential direction of the disc has been set. Then, the optical disc stamper is used and a resin such as polycarbonate is injection molded, thereby producing the optical disc of the present embodiment.

Third Embodiment

An embodiment of a third type optical disc according to the present invention will be described with reference to FIGS. 3, 7 and 8. Such description will explain, in accordance with the present invention, a method for calculating an optimum value of pit depth or groove depth of an optical disc.

Here, a measuring model used for calculating a relationship between a pit depth d and the light intensity of the diffracted light 807 is equivalent to that used in the above first embodiment shown in FIG. 8.

In a laser cutting process for manufacturing an optical disc stamper, at first, a plurality of optical discs 401 are prepared whose track pitches are all 680 nm but whose pit depths are different from one another. Then, the light intensity of the diffracted light 807 on each optical disc 401 is measured. Further, a relationship between the pit depth and the light intensity of the diffracted light 807 on each optical disc is calculated, thereby obtaining a curve 701 shown in FIG. 7. However, the pit depth may be indicated to be a length of an optical path obtained by multiplying an actual physical depth d with the refraction index n of the substrate plate 301. The curve 701 indicates that a light intensity will reach its peak value when the pit depth is 140 nm. If the largest light intensity is required to be 70% or higher, what is needed is only that the pit depth nd be in a range between 90 nm and 200 nm.

For the above reason, if the pit areas are formed such that the pit interval satisfies a condition that 90 nm≦nd≦200 nm, it is possible to clearly indicate any pictures formed on the surface of an optical disc.

In this way, an optical disc according to the present embodiment may be manufactured in the following process. Namely, the above-described method is used to manufacture an optical disc stamper having a predetermined pit area in which a predetermined pit depth has been set. Then, the optical disc stamper is used and a resin such as polycarbonate is injection molded, thereby producing an optical disc of the present embodiment.

Advantages

As described in detail in the above, according to the present invention, the pit interval and the pit shape of an optical disc are set such that the light intensity of a diffracted light will approach its largest value, thus making it possible to provide an improved optical disc capable of clearly indicating any pictures on a mastering art disc.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. An optical disc having a circular disc-like substrate including areas on which a plurality of pits have been formed, incident white light irradiating the pits being diffracted by said disc and having an effect of visibly indicating characters or pictures to an observer, said pits formed such that:

an interval Pθ between every two pits in the circumferential direction of the optical disc is 570 nm≦Pθ≦1000 nm.

2. An optical disc having a circular disc-like substrate including areas on which a plurality of pits have been formed, incident white light irradiating the pits being diffracted by said disc and having an effect of visibly indicating characters or pictures to an observer, said pits formed such that:

when the depth of each pit is d and the refraction index of the substrate is n, nd satisfies 90 nm≦nd≦200 nm.

* * * * *